June 10, 1952 F. A. WISSEL 2,599,798

LINEARITY CONTROL CIRCUIT FOR TELEVISION RECEIVERS

Filed Jan. 13, 1950 2 SHEETS—SHEET 1

INVENTOR.
FRANCIS A. WISSEL
BY
Alden D. Redfield
Charles M. Hogan
ATTORNEYS

June 10, 1952 F. A. WISSEL 2,599,798

LINEARITY CONTROL CIRCUIT FOR TELEVISION RECEIVERS

Filed Jan. 13, 1950 2 SHEETS—SHEET 2

AVERAGE PLATE CHARACTERISTICS
TRIODE SECTION OF TYPE 12SN7 TUBE

INVENTOR.
FRANCIS A. WISSEL
BY
Alden D. Redfield
Charles M. Hogan
ATTORNEYS

Patented June 10, 1952 2,599,798

UNITED STATES PATENT OFFICE 2,599,798

LINEARITY CONTROL CIRCUIT FOR TELEVISION RECEIVERS

Francis A. Wissel, Cincinnati, Ohio, assignor to Avco Manufacturing Corporation, Cincinnati, Ohio, a corporation of Delaware Application January 13, 1950, Serial No. 138,315

10 Claims. (Cl. 315—27)

Figure 1:
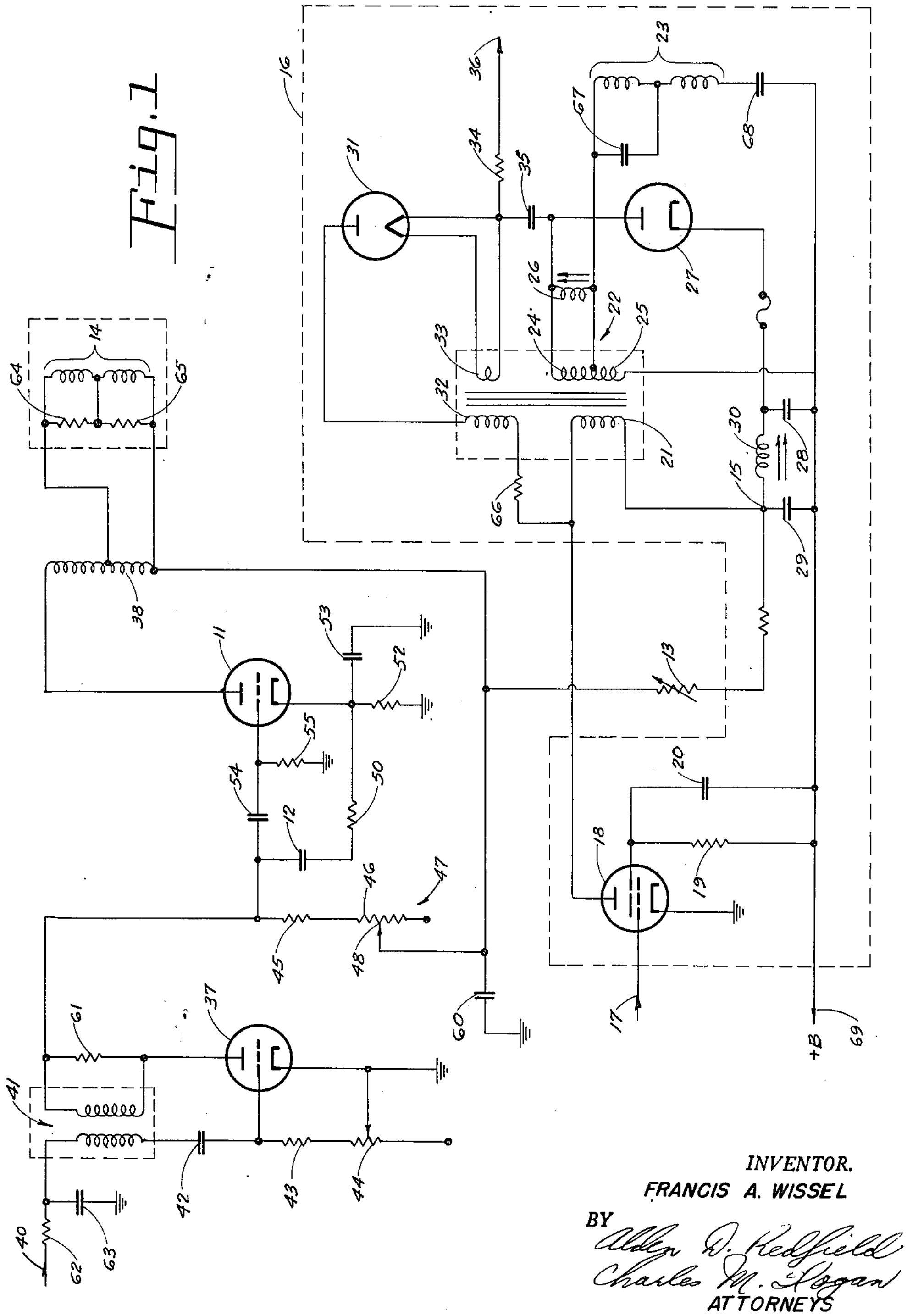

The present invention relates to improvements in cathode ray tube deflection systems and specifically to a novel circuit for automatically maintaining the linear wave form of currents flowing in one set of electromagnetic beam-deflecting elements throughout a range of amplitudes of such currents and a range of changes of the extent of deflection. The invention is of particular utility as embodied in the vertical deflection system of a television receiver and the preferred form of the invention herein shown is so described.

The usual vertical deflecting system comprises a sawtooth capacitor, which is periodically linearly charged along a sawtooth voltage characteristic from a suitable energy source, a blocking oscillator, which is periodically triggered into conductivity by field-frequency synchronizing pulses to discharge the sawtooth capacitor, a power amplifier or repeater tube having its conductivity controlled by the voltage on the sawtooth capacitor in such a way as to produce periodically recurring currents of approximately sawtooth wave form, an output transformer and the vertical deflection windings of a cathode ray tube. It is desirable that currents of pure sawtooth wave form flow in the deflection windings, the linearly increasing current during the relatively long trace interval causing the electron beam relatively slowly to traverse the screen at a uniform velocity, and the rapidly decreasing current during the relatively short retrace interval causing the beam very rapidly to fly back to the initial position assumed before trace. A pure sawtooth wave form can not readily be achieved in the deflecting windings by a pure sawtooth output from the power tube anode circuit. A current of this wave form at the power tube anode includes a wide band of frequencies, and unless the very best and most expensive output transformer is used distortion is introduced, whereby the wave form of current which is applied to the deflection windings by a linearly-operated power tube tends to be bent-over and to "sag" or drop off from linearity. Unless preventive measures are taken, in the vertical system, such distortion causes crowding of the lower portion of the image raster. In other words, the last half of the sawtooth voltage applied to the power tube does not produce so great an extent of beam deflection as does the first half, when such preventive measures are not taken.

Various endeavors to eliminate this difficulty have been made. The general principle of the curative measures is the introduction of predistortion or counterdistortion ahead of the output-transformer deflection winding circuit to compensate for the undesired distortion, the one effect opposing and neutralizing the other, whereby practical linearity of current flow is attained in the deflection windings during trace intervals. The usual expedient is to employ a power amplifier triode or pentode having a non-linear portion on its grid-voltage plate-current characteristic, and to operate the tube at such a point on the characteristic that the last half of the sawtooth applied to the grid produces a greater increment of plate current than does the first half. An operating point is so chosen that the current predistortion introduced by the non-linearity of the tube approximately balances out the current distortion introduced by the non-linearity of the output-transformer deflecting windings circuit.

This expedient gives generally satisfactory results when the operating point and amplitude of the sawtooth voltage which drives the power tube are fixed. In other words, for a predetermined picture height, for example, the driving voltage, grid bias of the tube, plate supply voltage, and plate current may be so determined that a reasonable approximation of a pure sawtooth current wave form in the deflecting windings is achieved. However, when the amplitude of the driving voltage is increased or decreased, in order to increase or decrease picture height, as by an adjustment of a picture size control, then the linearity control must be readjusted. The linearity control in prior art systems generally takes the form of an adjustable cathode bias resistor in circuit with the power amplifier tube. Conversely, when the linearity control is adjusted, the size control must also be adjusted. One of the primary objects of the present invention is to provide a circuit in which manual adjustment of the height control is automatically accomplished by all of the necessary circuit conditions which provide linearity, without requiring any adjustment of the linearity control. The importance of this object is evidenced by the delicate and time-consuming operations in production testing and servicing which have heretofore been made necessary by the dependence of linearity on size adjustment. Those operations are annoying and critical.

The invention provides a circuit which so operates that when picture linearity is achieved it is automatically retained throughout a range of picture height adjustments.

There is another serious limitation in prior art linearity controls which are premised on the "counterdistortion" principle. Since they are premised on a predetermined grid-voltage plate-current characteristic, there is only one linearity control setting which produces a given wave form of deflection current. When the size control (such as the height control) is readjusted to vary the amplitude of the sawtooth voltage drive on the power amplifier, that form is disturbed and there is a departure from the desired approximately pure sawtooth wave form of deflection current. The linearity control may then be readjusted again to achieve an approximately sawtooth wave form of deflection current, but the last-named form is not the same as the given wave form achieved at the outset. Stating the proposition in another way, a specific wave form of deflection current can be obtained in prior-art devices, premised on a given plate supply voltage, by only one driving voltage amplitude at only one setting of the linearity control, and at only one power tube operating point. This discussion assumes, of course, that the power tube is operated on a non-linear portion on the grid-voltage plate-current characteristic in order to introduce the required counterdistortion. The limitation is analogous to that which would be suffered by a superheterodyne receiver which is in alignment for only one channel in a band of received signals. In the latter there would be a departure from alignment when the receiver is tuned away from that channel. In prior-art television receivers, there is a departure from deflecting current linearity when picture size is adjusted away from the size at which linearity was achieved. Another primary object of the present invention is to provide a circuit which so operates that substantially the same wave form of deflecting current is automatically obtained throughout a range of picture sizes and driving voltage amplitudes.

For a better understanding of the present invention, together with other and further objects, advantages and capabilities thereof, reference is made to the following description of the accompanying drawings, in which there is illustrated a preferred form of circuit for linearizing sawtooth deflecting currents in a television receiver, this circuit being herein disclosed as incorporated in the field-frequency or vertical deflecting system of the receiver.

Figure 2:
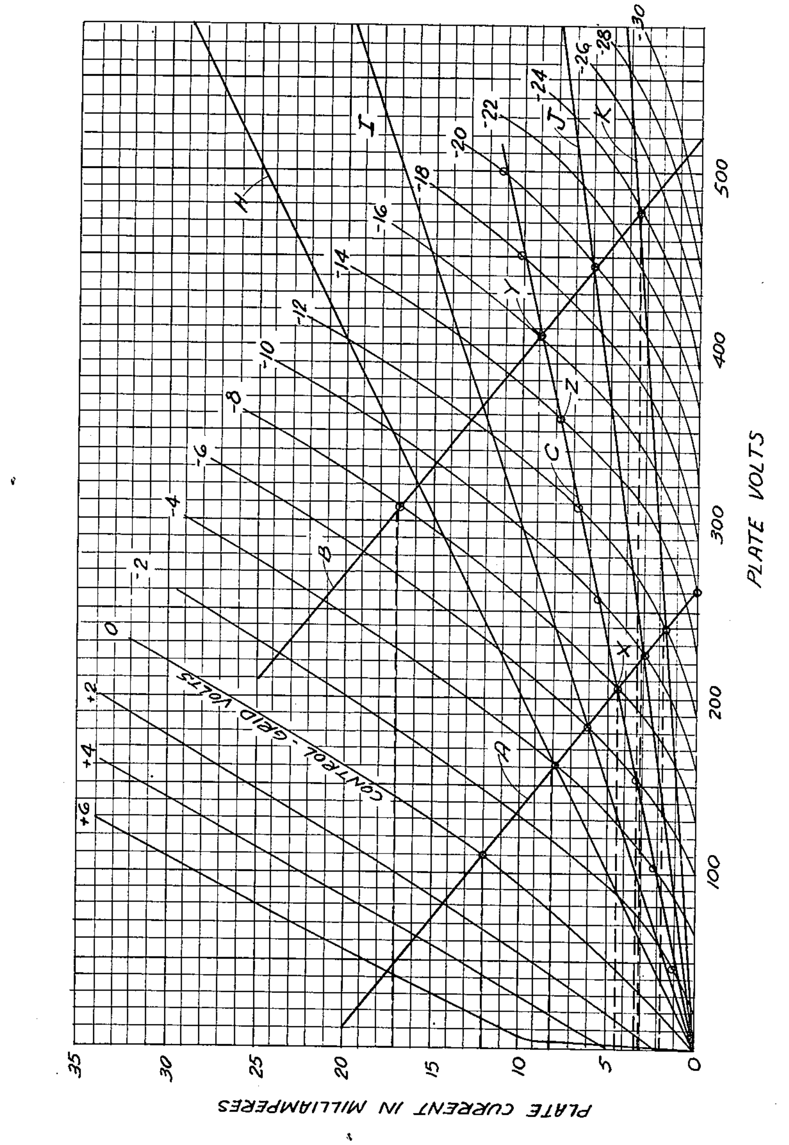

In the drawings:

Fig. 1 is a circuit schematic of certain portions of the vertical and horizontal deflecting systems of a television receiver, the current-linearizing circuit in accordance with the invention being included in the vertical system; and Fig. 2 is a set of curves employed as an aid in describing the invention.

At the outset, attention is invited to the fact that the same source supplies energy to the anode of the vertical system power output tube 11 and to the sawtooth capacitor 12, through a variable height-control resistor 13, in such a way that when the height-control is varied to increase (or decrease) the driving voltage on the grid of the tube 11, the plate voltage of tube 11 is at the same time increased (or decreased) to shift the load line in the direction and to the extent required to maintain the linear wave form of the deflecting currents in deflecting windings 14. Particular attention is directed to those features as the detailed description proceeds.

The positive terminal of the common source of charging current for sawtooth capacitor 12 and anode current for tube 11 is indicated by the reference numeral 15, designating the high potential terminal of a voltage-boost capacitor included in the output of the horizontal system. The horizontal system, included within the dashed outlines 16, is per se a part of the prior art and need not be described in detail herein. Briefly, however, driving voltages of sawtooth wave form are applied at 17 to the input circuit of a horizontal output power amplifier tube 18, the latter being provided with a screen dropping resistor 19, bypassed by capacitor 20, connected to the positive terminal (+B) of a low-voltage plate supply source (not shown). The output of this amplifier stage is coupled by a transformer network 21, 22 to the horizontal deflecting windings 23, and the current waves appearing in the plate circuit of tube 18 are employed periodically to produce sawtooth currents of line frequency in coils 23, thereby to deflect the electron beam in the cathode ray picture tube (not shown) at line frequency.

The circuits intercoupling the horizontal output tube 18 and the deflection coils 23 are described in detail in the following patents and publications: Kiver, Television Simplified, pp. 207–213, second edition, 1948, D. Van Nostrand, Inc., New York, N. Y.; U. S. Patent No. 2,440,418, Tourshou. The primary 21 is coupled to a secondary 22 comprising series portions 24, 25, portion 25 being connected across the deflecting windings 23. For purposes of width control there is connected in shunt with portion 24 a variable inductor 26, the function of which is well known to the art and is considered in such patents as U. S. Patent 2,449,969 to Wright. It will be understood that the vertical deflecting windings 14 and the horizontal deflecting windings 23 form part of a yoke assembly embracing the neck of a cathode ray image reproducing tube (not shown).

The voltage variations applied to the control electrode of horizontal power tube 18 produce an increasing plate current in that tube during line scansion, which current is interrupted at the beginning of line retrace time. The current in the deflection coils 23 and the horizontal output transformer does not disappear at the instant of cut-off of tube 18, however, due to the inherent distributed capacity of the circuit. The inductance of these coils and transformer, together with this distributed capacity, forms a tuned circuit in which high frequency oscillation can be produced. Oscillation begins with the start of retrace time (cut-off of tube 18) and continues for one-half cycle, the oscillation being stopped at the negative current peak by a series combination of a diode 27 and a capacitor 28, connected across the output transformer secondary. The polarities immediately following line retrace are such that damper tube 27 conducts and continues to conduct until tube 18 again becomes conductive. The voltage developed across capacitor 28 is such as to increase or boost the voltage available at +B terminal 69. The voltage at terminal 15 is approximately equal to the sum of the voltage at terminal 69 and the voltage across capacitor 28. Capacitor 28 is charged during each conduction period of damper 27, thereby recovering from the horizontal deflecting system some of the energy dissipated by the collapsing field during retrace. The flow of "boost current" into capacitor 28 is substantial. The primary winding 21 of the horizontal output transformer is connected to a capacitor 29 in such a way that a varying voltage is developed across capacitor 29, which voltage is applied to capacitor 28 through variable inductor 30, for purposes of linearity control, as explained in the aforementioned Tourshou Patent 2,440,418. The plate current path of output tube 18 may be traced through primary 21, inductor 30, diode 27, secondary 24, 25 to terminal 69. It will be noted that capacitor 28 is in shunt with that portion of this path which comprises diode 27 and secondary 24, 25 so that the plate voltage supplied to tube 18 is the sum of the +B voltage and the voltage across capacitor 28.

A conventional flyback high voltage supply source is indicated. It comprises a rectifier tube 31, for rectifying the high voltage induced in series windings 32 and 21 of the output transformer during line retrace intervals, a filament-supply winding 33 and a filter network comprising series resistor 34 and shunt capacitor 35. A very high voltage is available at terminal 36, which is usually connected to the accelerating or second anode of a cathode ray tube (not shown).

The system included within dashed outlines 16 is conventional. It is of interest so far as the present invention is concerned only in that the energy source between terminal 15 and ground is common to the anode of tube 11 and sawtooth capacitor 12. Any suitable energy source may within the teachings of the invention be substituted for the convenient one herein shown.

In accordance with the invention there is provided the combination of a sawtooth capacitor 12, a power output tube 11, a common source of voltage for charging said capacitor and energizing said tube and means for simultaneously varying the plate voltage applied to said tube and the amplitude of the voltage waves developed at said capacitor and applied to said tube. The common source of voltage is available between terminal 15 and ground. The height-control resistor 13 is here shown as the means for simultaneously varying the plate voltage applied to tube 11 and the amplitude of the voltage waves developed at capacitor 12 and applied to the grid circuit of tube 11. Particular attention is again directed to the elements 15, 13, 12, and 11 and the elements immediately associated therewith.

Referring now to the vertical deflecting system herein shown, it comprises the following major elements: a blocking oscillator tube 37, which is periodically triggered into intervals of conductivity to discharge sawtooth capacitor 12, each being followed by an interval of nonconductivity during which capacitor 12 is charged; the sawtooth capacitor 12, across which voltage waves of sawtooth form are generated at field frequency; power amplifier tube 11 for responding to those waves to produce sawtooth deflecting currents; output transformer 38; and vertical deflecting windings 14.

Vertical synchronizing pulses are applied at 40 to the input circuit of blocking oscillator tube 37, which functions as a switching tube at field frequency to provide a short time-constant discharge path for capacitor 12. The plate and grid circuits of tube 37 are inductively coupled by a transformer 41, a blocking capacitor 42 being interposed betwen grid winding and grid. A resistor 43 and an adjustable resistor 44, arranged in series between grid and cathode of tube 37, provide a leakage path for the electrical charge stored in capacitor 42. Resistor 44 is adjustable to control the grid-circuit time-constant to vary the period of nonconductivity of the oscillator plate circuit, and is known as the "vertical hold control." Anode voltage for this tube 37 is supplied from the common energy source (between terminal 15 and ground), the cathode being grounded and the plate being connected to terminal 15 by a series circuit comprising the secondary of transformer 41, resistor 45, portion 46 of resistor 47, and variable resistor 13.

Resistor 13, in the feed circuit of the anode of tube 37, is adjustable to vary the time constant of the charging path for capacitor 12 and to determine the peak voltage to which capacitor 12 is charged. Resistor 13 therefore constitutes the "vertical height control."

The operation of blocking oscillators is fully described in the prior art, as in U. S. Patent 2,101,520 to Tolson, for example, and the description may proceed to other elements of the vertical deflecting circuit without further discussion of tube 37.

Sawtooth capacitor 12 is in series with peaking resistor 50, which is connected to the high-potential side of the cathode-biasing resistance 52 of tube 11. Resistor 52 is by-passed by a capacitor 53. Capacitor 12 is periodically charged through the time-constant circuit comprising terminal 15, resistor 13, portion 46 of resistor 47, resistor 45, sawtooth capacitor 12, resistor 50, resistor 52, ground and the above-described common voltage source.

Sawtooth capacitor 12 is periodically discharged through a short time-constant circuit comprising ground, the cathode-anode path of tube 37, capacitor 12, resistors 50 and 52, and ground.

The sawtooth capacitor output is applied to power amplifier tube 11 by a coupling network comprising a coupling capacitor 54 and a grid resistor 55, the latter being connected between the control electrode of tube 11 and ground, and the coupling capacitor being connected between the high potential terminal of sawtooth capacitor 12 and the control electrode of tube 11.

The anode of tube 11 is connected to the common energy source through the primary of the vertical output transformer and height control resistor 13. It should be particularly noted that, in accordance with the invention, resistor 13 is included in both the charge path of sawtooth capacitor 12 and the anode supply path of power tube 11. The significance of this important feature is this: When resistor 13 is decreased in value to increase picture height (i. e., to increase the amplitude of the sawtooth voltage waves generated across sawtooth capacitor 12), the decreased value of resistor 13 also causes an increase in the anode potential applied to power tube 11, shifting the load line outwardly away from the origin (Fig. 2, point O) of the plate characteristic family of curves into a region such that the tube 11 introduces substantially the same counterdistortion of wave form as it introduced before the change in value of resistor 13. Conversely, when resistor 13 is increased in value, the load line is shifted inwardly in order to maintain linearity of deflection currents. A shift in operating point accompanies the shift of load line, the tube 11 being cathode biased. This shift in operating point is a factor in preserving the desired linearity.

Electromagnetic deflecting systems in general are directed to the production of linear sawtooth current waves in the yoke, and the invention is directed to the production of such waves. The starting step is to charge capacitor 12 along a substantially linear portion of its voltage-time exponential charge characteristic and to terminate each charge before the non-linear portion is reached. Both the present circuit and the prior-art devices generate linear voltage waves across capacitor 12, which is called a "sawtooth capacitor" for that reason. The next step is to provide a peaking resistor 50, in series with capacitor 12, so that the voltage appearing across the elements 12, 50 and applied to the input of tube 11 is of trapezoidal wave form. In other words, the shape of the voltage wave ultimately impressed on deflection windings 14 must be such as to compensate for the effect of the resistance inherent in those windings. Both the present circuit and prior-art devices apply trapezoidal voltage waves to the input of the power tube and these are herein referred to as sawtooth voltage waves for purposes of simplicity. The third step is the one with which the present invention is primarily concerned, and it involves precautions to prevent the departure from linearity which is introduced by the output transformer 38, here shown as an auto-transformer. The transformer circuit tends to make the wave of current in windings 14 non-linear, to introduce such distortion that each current wave falls off from the peak which is desired as it approaches its maximum value, and to crowd the lower portion of the image raster, the standard direction of vertical trace being from top to bottom of the raster.

The third step taken in accordance with the prior art involves taking advantage of the non-linear portion of the grid-voltage plate-current characteristic of a triode tube, for example, to introduce predistortion or counterdistortion of the tube output in such a way that the counter-distortion introduced by the tube and the distortion introduced by the output transformer circuit balance each other out, as described at page 323, Basic Television — Principles and Servicing, Bernard Grob, McGraw-Hill Book Company, Inc., New York, 1949. In other words, the prior art teaches that a triode such as tube 11 can be so operated that the last half of the driving sawtooth voltage, for example, produces a greater increment of plate current than the first half. However, with a given plate voltage as shown in the prior art, if it be assumed that linearity throughout vertical trace can be achieved in windings 14 with a predetermined bias on tube 11 and a predetermined picture height and amplitude of driving sawtooth voltage, linearity is lost when the picture height and amplitude of driving sawtooth voltage are changed. The prior art requires a separate manual operation, as by readjustment of the value of the cathode-biasing resistor, as a corrective measure for again approaching linearity. And such reapproach cannot be very close because readjustment of that value alone will not result in the restoration of the same deflecting current wave form as was originally present.

Prior art devices of the class under consideration work from a single load line such as that designated "A" in Fig. 2. To illustrate the serious limitations of such devices, it will be assumed that the sawtooth voltage drive on the grid of the power tube incorporated therein is from an operating point of −8 volts to extremes of −4 and −12 volts. The last half of the driving voltage produces a plate current increment of approximately 3.5 milliamperes. The first half of the driving voltage produces a plate current increment of approximately 2.7 milliamperes. The ratio of the half increments is approximately 1.30. The ratio of the end quarter increments such as between (−4 and −6) and between (−10 and −12) volts produces an even greater ratio of $$\frac{1.8}{1.25} \text{ or } 1.44$$

This illustrates that with a given drive, the counterdistortion ratio increases with smaller end increments.

Let the drive on the grid be now doubled so that it is from an operating point of −8 to extremes of 0 and −16 volts. The half increment ratio now becomes $$\frac{7.8}{4.3} \text{ or } 1.81$$

while the end quarter increment ratio becomes $$\frac{4.3}{1.6} \text{ or } 2.69$$

Thus a 100% increase in drive has increased the half increment ratio 39% and the end quarter increment ratio 86%. This is an intolerable change in linearity particularly at the start of the sweep.

The data from which these calculations were made are as follows:

| Grid Voltage (Volts) | Plate Current (Milliamperes) | Changes in Plate Current (Milliamperes) | |
|---|---|---|---|
| −4 | 8.0 | | |
| | | | 1.8 |
| −6 | 6.2 | 3.5 | |
| −8 | 4.5 | | |
| −10 | 3.05 | 2.7 | |
| | | | 1.25 |
| −12 | 1.8 | | |

The prior art manually adjustable linearity control seeks to shift the operating point in order to relieve this intolerable condition. However, it suffers from two serious limitations: (1) it must be reset whenever the height control is reset; (2) even though such resetting can aim at the rough ratio mentioned, it cannot restore the identical wave shape of the deflecting current and that wave shape will be distinctly different for various locations of the operating point X along load line A. The invention dispenses with resetting of the linearity control for each resetting of the height control, and it also preserves the deflecting current wave shape. It will be understood that the problem solved by the present invention is not simply one of maintaining increments of plate current in proportion to distinct halves of the driving sawtooth voltage. The problem is to maintain the shape of the deflection current wave throughout a wide range of picture heights. The prior art device cannot accomplish preservation of this form, because each operating point involves a distinct deflecting current wave form, when plate voltage is fixed. This statement becomes clear when it is considered that operation on a linear portion of the grid voltage plate current characteristic would introduce no counterdistortion at all. Counterdistortion tends to increase as the selected operating point along a given load line is made more negative. With the prior art device optimum counterdistortion may be attained for only one picture height. The invention provides a circuit in which optimum counterdistortion is attained for various heights.

The load lines shown in Fig. 2 assume a pure resistive load for purposes of simplicity and clarity in explanation. It is recognized that the load on the vertical output tube is inductively reactive, but the same is true of prior art linearity control systems and in making the comparison of the present system with prior art systems, I give the latter the benefit of the same assumption. Fig. 2 illustrates a family of plate characteristic curves for one triode section of a 12SN7 tube, the generally diagonally oriented curves representing plate current values in milliamperes as ordinates plotted against plate voltage values as abscissae, for various values of applied grid voltage. The invention teaches that the desired counter-distortion may be preserved in a self-biased triode not only by moving the operating point to a more negative point, but also by moving the load line outwardly from the origin O as the picture height and sawtooth driving voltage amplitude are increased.

To illustrate the striking effect accomplished by the present invention, let a new load line B be chosen for the increased voltage swing and let the amplitude of the driving voltage now be 16 volts, swinging from −16 volts to extremes of −8 and −24 volts. The ratio of the plate current increment for the last half of the driving voltage to the plate current increment for the first half of the driving voltage is now $$\frac{8}{5.75} \text{ or } 1.39$$

It will be observed that this change in linearity is very tolerable and is very close to the original ratio of 1.30. The ratio of the end quarter increments is now $$\frac{4.3}{2.55} \text{ or } 1.69$$

which is not far removed from the original ratio of 1.44 and represents a drastic improvement in maintenance of the constancy of linearity over the ratio of 2.69 which is obtained by simply doubling the driving voltage, without providing the other changes in circuit conditions effected by the present invention. Thus it will be seen that the invention accomplishes a remarkable improvement in the preservation of linearity.

The Fig. 2 data for load line B are as follows:

| Grid Voltage (Volts) | Plate Current (Milliamperes) | Changes in Plate Current (Milliamperes) | |
|---|---|---|---|
| −8 | 17.0 | | |
| | | | 4.3 |
| −12 | 12.7 | 8.0 | |
| −16 | 9.0 | | |
| −20 | 5.8 | 5.75 | |
| | | | 2.55 |
| −24 | 3.25 | | |

For purposes of illustration it was assumed in the above discussion that the original drive was doubled. In practice changes in the amplitude of the driving voltage are considerably less than that supposed in the above discussion and therefore the practical improvement in the maintenance of linearity effected by the present invention is such as to make possible the elimination of linearity control adjustment.

By the use of design methods well known to those skilled in the art, those who have the teachings of the invention before them can with facility choose load lines A and B, plate voltages, and a cathode resistor value such that the ratios which prevail for the smaller drive and the larger drive can be made substantially equal. Linearity is then achieved for a maximum picture height and a minimum picture height and is automatically very closely approximated at all points between those two extremes, dispensing with the necessity of a resetting of the linearity control whenever the height control is readjusted.

The curves of Fig. 2, exclusive of load lines A and B, are substantially a reproduction of the average plate characteristics for the 12SN7GT type tube, as shown in the Technical Manual, Sylvania Radio Tubes, copyright 1946, compiled and published by Sylvania Electric Products, Inc., Emporium, Pennsylvania.

It is recognized that the dynamic operating points for curves A and B will actually lie slightly above and to the left of the quiescent-condition operating points X and Y, since the average plate current increases with excitation, the current amplitude change for the last half of the driving voltage swing exceeding that for the first half of the swing. "In many analyses of vacuum tube circuits, particularly when triodes are used, it is nevertheless permissible to assume . . . that the static and dynamic operating points coincide," Reich, Theory and Application of Electron Tubes, p. 103, McGraw-Hill Book Co., Inc., New York, 1944. There are two other reasons why this coincidence may be properly assumed in this case: (1) Since bias is obtained by the use of a cathode resistor, the change in bias with average cathode current results in appreciable reduction in the shaft of the operating point, as between quiescent and excitation conditions with a given plate voltage: (2) since the shift along curve B is in the same direction as along curve A, the shift is fairly neglected for both conditions compared.

Curve C represents grid bias for various values of plate current and was plotted from a series of points, each of which represents the intersection of a line drawn from the plate current axis to the plate characteristic representative of grid bias for that value of plate current. For example, point Z indicates that, with a cathode resistor of 563 ohms, at plate current of 7.9 milliamperes, the grid bias is equal to 14 volts. Curve C intersects the load lines A and B at the operating points X and Y. The increasing plate current as the plate voltage is increased automatically shifts the operating point from X to Y, the power tube 11 being self-biased.

The invention produces the desired result because a change in the amplitude of the driving voltage or an adjustment in the height control is automatically accompanied by changes in plate voltage and grid bias of such a nature as to maintain the over-all linearity of the system. Prior art devices are premised on the principle that linearity adjustment can be effected by changes in grid bias alone. That is a step in the right direction but it does not go far enough. A considerably longer step is the realization that plate voltage and cathode bias or grid voltage must both be changed for the purpose of automatically maintaining linearity throughout the system.

While I do not desire to be limited to any specific circuit components, there being a wide range of components available to one who desires to practice the present invention, the following circuit parameters have been found entirely satisfactory:

| | |
|---|---|
| Tube 11 | One section of type 12SN7 |
| Capacitor 53 | 100 microfarads |
| Resistor 52 | 1800 ohms |
| Resistor 50 | 3300 ohms |
| Resistor 55 | 2.2 megohms |
| Capacitor 54 | 0.1 microfarad |
| Capacitor 12 | 0.1 microfarad |
| Resistor 45 | 0.82 megohm |
| Resistor 47 | 2.5 megohm, variable |
| Capacitor 60 | 10 microfarads |
| Resistor 61 | 10,000 ohms |
| Tube 37 | One section of type 12SN7 |
| Resistor 44 | 1.5 megohms, variable |
| Resistor 43 | 1.2 megohms, variable |
| Capacitor 42 | 0.0047 microfarad |
| Resistor 62 | 8200 ohms |
| Capacitor 63 | 0.005 microfarad |
| Resistor 64 | 1000 ohms |
| Resistor 65 | 1000 ohms |
| Tube 18 | Type 25AU5 |
| Resistor 19 | 8200 ohms |
| Capacitor 20 | 0.05 microfarad |
| Height control resistor 13. | 50,000 ohms, variable |
| Resistor 66 | 10,000 ohms |
| Tube 31 | Type 1X2 |
| Capacitor 35 | 0.00047 microfarad |
| Tube 27 | One section of type 50AXG6 (or single 25W4) |
| Capacitor 67 | 0.56 micromicrofarad |
| Capacitor 68 | 0.5 microfarad |
| Capacitor 29 | 0.1 microfarad |
| Capacitor 28 | 0.2 microfarad |
| Voltage available at terminal 69. | 235 volts |

In the specific example herein disclosed, in shifting from load line A to load line B the applied anode voltage, the cathode self-bias and the amplitude of the driving voltage applied to the grid were all increased in proportion and approximately doubled.

Resistor 47 is made variable to provide for some manual adjustment of the sawtooth voltage drive on tube 11 independent of the plate voltage applied to tube 11. This adjustment is made prior to the described operation of my novel invention in order to obtain optimum predistortion at the outset. The invention so operates as to maintain this optimum predistortion in the manner pointed out above. The capacitor 60 between sliding tap 48 on resistor 47 and ground functions as a shunt filter capacitor.

It will be seen from the foregoing that the invention provides the combination of a non-linearly operated power output tube 11 having cathode, anode, and control grid electrodes, a cathode bias resistor 52 in series wth said cathode, an electromagnetic beam deflecting winding 14, a transformer 38 for coupling said winding to the anode circuit of said tube, means including a periodically charged capacitor 12 coupled to the grid circuit of said tube for impressing on said tube voltage waves each having a linear wave portion, the extent of which determines a dimension of the image raster, whereby said tube impresses on said winding deflecting current waves each having a linear wave portion, a voltage source (between 15 and ground) for charging said capacitor and providing anode voltage for said tube, and means including a variable resistor 13 in series with said source and said capacitor and said anode for simultaneously increasing or decreasing the plate voltage applied to said anode as the extent of said charge is increased or decreased, thereby to preserve the counterdistortion introduced by the non-linear impedance of said tube to compensate for the distortion introduced by said transformer.

Particular attention is invited to the lines H and K in Fig. 2. It is observed that the line K passes very close to the points at which load line A intersects the —12 volt curve and load line B intersects the —24 volt curve. The line H intersects the load line A very close to the —4 volt curve intersection. The distance between the point of intersection of the —8 volt curve and load line B is not far removed from the intersection of line H with load line B. If these two points coincided, the linearity control would be substantially perfect, because the ratios hereinabove discussed would then be substantially the same for the smaller drive (—12 to —4 volts) as for the larger drive (—24 to —8 volts).

While there has been shown and described what is at present considered to be the preferred embodiment of the present invention, it will be obvious to those skilled in the art that various changes and modifications may be made within the teachings of the invention and the scope of the appended claims. For example, in lieu of a cathode bias resistor 52 other methods of biasing the grid of tube 11 and increasing the bias as the plate voltage of the tube increases may be employed. Also, while I have specifically shown a triode power amplifier tube in the illustrative Fig. 1 embodiment, it is commonly known in the art that pentodes may be substituted for triodes. It is also commonly known in the art that various control effects which are obtained by varying anode circuit conditions may likewise be obtained by varying screen voltage conditions or both screen and plate voltage conditions. Additionally, other energy sources may be provided in lieu of the one herein illustrated. It is the intention of the appended claims to cover all such modifications and substitutions of equivalents as will be apparent to those skilled in the art who have this disclosure before them.

Having thus fully disclosed and described the invention, I claim:

1. In a television receiver the combination of a non-linearly operated power output repeater tube having at least cathode, anode, and control grid electrodes, a cathode bias resistor in series with said cathode, an electromagnetic beam deflecting winding, a transformer for coupling said winding to the anode circuit of said tube, means including a periodically charged capacitor coupled to the grid circuit of said tube for impressing on said tube voltage waves each having a linear wave portion, the extent of which determines a dimension of the image raster, whereby said tube impresses on said windings deflecting current waves each having a linear wave portion, a voltage source for charging said capacitor and providing anode voltage for said power output tube, and means including a variable resistor in D. C. series with said source and said transformer and said capacitor and said repeater tube anode for simultaneously increasing or decreasing the plate voltage applied to said repeater tube anode as the extent of said charge is increased or decreased, respectively, thereby to utilize the counterdistortion introduced by the non-linear impedance of said tube to compensate for the distortion introduced by said transformer.

2. In a television receiver the combination of a non-linearly operated power output repeater tube having at least cathode, anode, and control grid electrodes, a cathode bias resistor in series with said cathode, an electromagnetic beam deflecting winding, a transformer for coupling said winding to the anode circuit of said tube, means including a periodically charged capacitor coupled to the grid circuit of said tube and included in a time-constant charging network for impressing on said tube voltage waves each having a linear wave portion, the extent of which determines a dimension of the image raster, whereby said tube impresses on said winding deflecting current waves each having a linear wave portion, a voltage source for charging said capacitor and providing anode voltage for said tube, and a variable resistor in series with said source and said transformer and said power output tube anode and included in said network for simultaneously increasing or decreasing the plate voltage applied to said power output tube anode as the extent of said charge is increased or decreased, respectively, thereby to utilize the counterdistortion introduced by the non-linear impedance of said tube to compensate for the distortion introduced by said transformer.

3. In a television receiver deflection system, the combination of a non-linearly operated electron repeater valve having at least cathode, anode, and control grid electrodes, means for biasing said grid, a pair of beam-deflecting elements, means for coupling said elements to the anode circuit of said valve, means coupled to the input circuit of said valve for impressing on said valve voltage waves each having a linear wave portion, the extent of which determines a dimension of the image raster, whereby said valve impresses on said beam-deflecting elements deflecting current waves each having a linear wave portion, unitary means for providing grid-bias and anode voltage for said valve, and means in series with the coupling means for simultaneously increasing or decreasing the anode voltage and grid bias applied to said valve as the amplitude of said voltage waves is increased or decreased, thereby to utilize the counterdistortion introduced by the non-linear impedance of said valve to compensate for the distortion introduced by said coupling means.

4. In a television receiver deflection system of the type including a non-linearly operated electron repeater tube having at least cathode, anode, and control grid electrodes, means for biasing said grid, a pair of beam-deflecting elements, means for coupling said elements to the anode circuit of said tube, and means including a capacitor coupled to the input circuit of said tube for impressing on said tube voltage waves each having a linear wave portion, the extent of which determines a dimension of the image raster, whereby said tube impresses on said beam-deflecting elements deflecting current waves each having a linear wave portion, the combination of unitary means for charging said capacitor and providing grid-bias and anode voltage for said tube, and means in series with the coupling means for simultaneously increasing or decreasing the anode voltage and grid bias applied to said tube as the extent of said charge is increased or decreased, thereby to utilize the counterdistortion introduced by the non-linear impedance of said tube to compensate for the distortion introduced by said coupling means.

5. In a television receiver deflection system, the combination of a non-linearly operated electron repeater tube having at least cathode, anode, and control grid electrodes, means for biasing said grid, a pair of beam deflecting elements, means including a transformer for coupling said elements to the anode circuit of said tube, means including a storage capacitor having a charging network coupled to the input circuit of said tube for impressing on said tube voltage waves each having a linear wave portion, the extent of which determines a dimension of the image raster, whereby said tube impresses on said beam-deflecting elements deflecting current waves each having a linear wave portion, means for charging said capacitor and providing grid-bias and anode voltage for said tube, and means included in said network and in series circuit with said anode for simultaneously increasing or decreasing the anode voltage and grid bias applied to said tube as the extent of said charge is increased or decreased, thereby to utilize the counterdistortion introduced by the non-linear impedance of said tube to compensate for the distortion introduced by said transformer.

6. In a television receiver deflection system, the combination of sawtooth-voltage generating means, a self-biased repeating vacuum tube having a cathode, control electrode, and an anode, the input circuit of said vacuum tube being coupled to said voltage-generating means and said tube being operated non-linearly, and means for maintaining substantially the same percentage of output distortion throughout a wide range of amplitudes of said sawtooth voltage, comprising a variable voltage source for supplying anode voltage to said tube in such a way that as the amplitude of said sawtooth voltage is increased or decreased, the load line of said tube is shifted outwardly or inwardly relative to the origin of the plate transfer characteristic and the operating point is made more negative, or less negative, respectively.

7. In a television receiver deflection system, the combination of sawtooth-voltage generating means including a storage capacitor, a self-biased repeating vacuum tube having a cathode, control electrode, and an anode, the input circuit of said vacuum tube being coupled to said voltage generating means and said tube being operated non-linearly, and means for maintaining substantially the same percentage of output distortion throughout a wide range of amplitudes of said sawtooth voltage, comprising a common variable voltage source for supplying anode voltage to said tube and energy to said capacitor in such a way that as the amplitude of said sawtooth voltage is increased or decreased, the load line of said tube is shifted outwardly or inwardly relative to the origin of the plate transfer characteristic and the operating point is made more negative or less negative, respectively.

8. In a television receiver vertical deflection system, the combination of sawtooth-voltage generating means including a storage capacitor, a self-biased repeating vacuum tube having a cathode, control electrode, and an anode, the input circuit of said vacuum tube being coupled to said voltage generating means and said tube being operated non-linearly, and means for maintaining substantially the same percentage of output distortion throughout a wide range of amplitudes of said sawtooth voltage, comprising a height control resistor in series with a common variable voltage source for supplying anode voltage to said tube in such a way that as the amplitude of said sawtooth voltage is increased or decreased, the load line of said tube is shifted outwardly or inwardly relative to the origin of the plate transfer characteristic and the operating point is made more negative or less negative, respectively.

9. In a television receiver vertical deflection system, the combination of sawtooth-voltage generating means including a storage capacitor, a self-biased repeating vacuum tube having a cathode, control electrode, and an anode, the input circuit of said vacuum tube being coupled to said voltage generating means and said tube being operated non-linearly, and means for maintaining substantially the same percentage of output distortion throughout a wide range of amplitudes of said sawtooth voltage, comprising a height control resistor in series with a common variable voltage source for supplying anode voltage to said tube in such a way that as the amplitude of said sawtooth voltage is increased or decreased, the load line of said tube is shifted outwardly or inwardly relative to the origin of the plate transfer characteristic and the operating point is made more negative or less negative, respectively, the voltage applied to the anode of said tube being increased or decreased in the same proportion as the amplitude of said sawtooth voltage, the self biasing of said vacuum tube also increasing or decreasing in proportion to said amplitude.

10. In a television receiver deflection system, the combination of sawtooth-voltage generating means, a self-biased repeating vacuum tube having a cathode, control electrode, and an anode, the input circuit of said vacuum tube being coupled to said voltage-generating means and said tube being operated non-linearly, and means for maintaining substantially the same percentage of output distortion throughout a wide range of amplitudes of said sawtooth voltage, comprising a variable voltage source for supplying space current to said tube in such a way that as the amplitude of said sawtooth voltage is increased or decreased, the load line of said tube is shifted outwardly or inwardly relative to the origin of the plate transfer characteristic and the operating point is made more negative, or less negative, respectively.

FRANCIS A. WISSEL.

REFERENCES CITED

The following references are of record in the file of this patent:

UNITED STATES PATENTS

| Number | Name | Date |
|---|---|---|
| 2,101,520 | Tolson et al. | Dec. 7, 1937 |
| 2,280,990 | White | Apr. 28, 1942 |
| 2,414,546 | Nagel | Jan. 21, 1947 |
| 2,440,418 | Tourshou | Apr. 27, 1948 |
| 2,440,786 | Schade | May 4, 1948 |
| 2,449,969 | Wright | Sept. 28, 1948 |
| 2,482,150 | Bocciarelli | Sept. 20, 1949 |
| 2,495,696 | Cawein | Jan. 31, 1950 |
| 2,517,715 | Rogers | Aug. 8, 1950 |